May 31, 1932.  C. LORBER  1,861,124
BISCUIT PACKAGE
Filed June 1, 1931
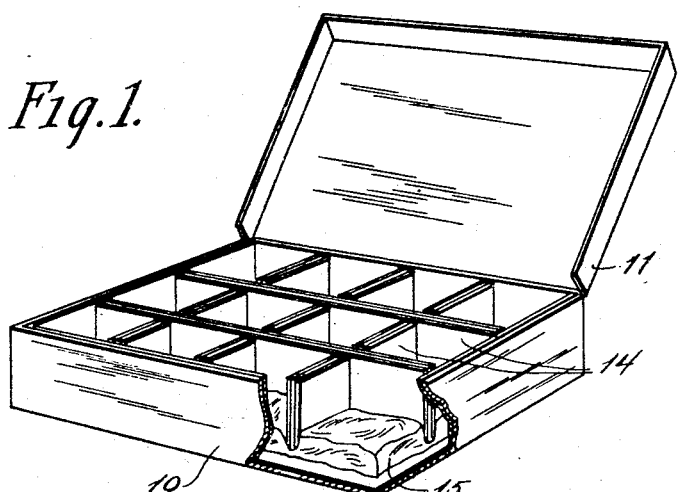
Fig.1.
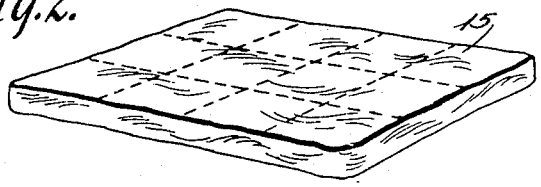
Fig.2.
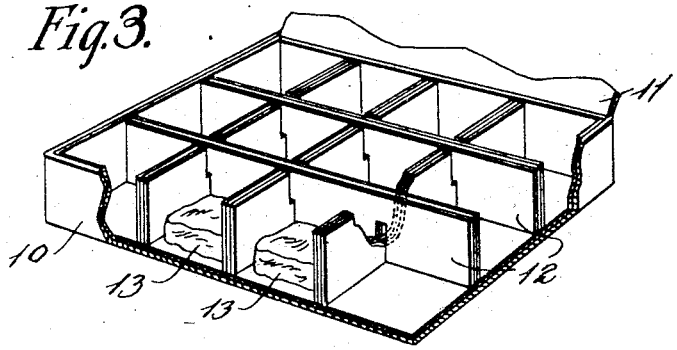
Fig.3.
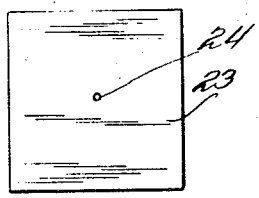
Fig.6.
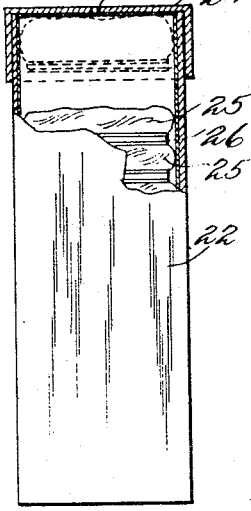
Fig.7.
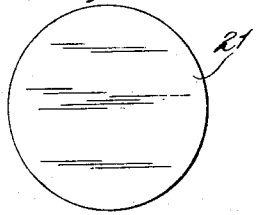
Fig.8.
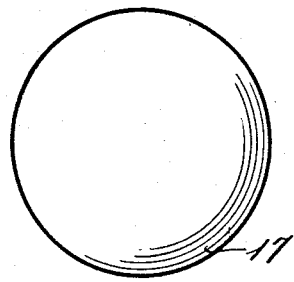
Fig.4.
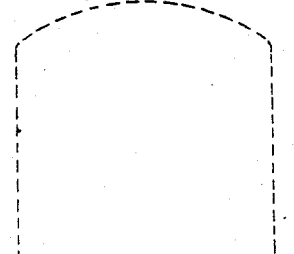
Fig.5.
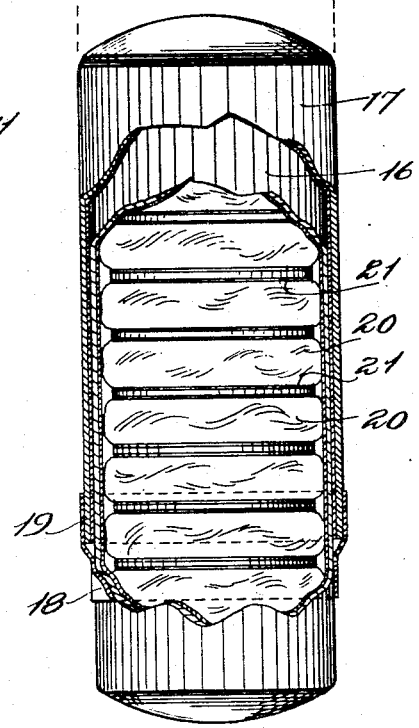
Inventor
Charles Lorber
By E. J. Clarkson
Attorney Patented May 31, 1932

1,861,124

UNITED STATES PATENT OFFICE

CHARLES LORBER, OF LOUISVILLE, KENTUCKY

BISCUIT PACKAGE

Application filed June 1, 1931. Serial No. 541,457.

This invention relates to packaging and has special reference to packages for uncooked biscuits.

It is a well recognized fact that biscuits, to be most palatable, must be served immediately upon being cooked.

It is also well recognized that biscuit dough and the like may be prepared and raised ready for placing in the oven for cooking a considerable time before being cooked if the prepared dough is kept in a refrigerator or other cold place in which the temperature is sufficiently low to inhibit further raising than happens during the primary raising period.

One important object of the present invention is to provide a novel package for packing prepared dough of this character so that it may be shipped from the bakery to the retailer and sold to the consumer without handling.

A second important object of the invention is to provide an improved package for this purpose wherein the several biscuits will be properly separated from each other.

A third important object of the invention is to provide an improved package for this purpose having a novel arrangement of partitions designed to separate a sheet of dough into several biscuits as the dough rises, the sheet being left intact at its bottom portion.

A fourth important object of the invention is to provide an improved biscuit dough package having a cover arranged to telescope on the lower part of body of the container as the dough rises whereby the telescoping of the top provides space for the increase in the size of the dough mass.

A fifth important object of the invention is to provide an improved arrangement of this character wherein the container is provided with vent means for the escape of air during the raising of the dough, such vent means being automatically closed upon the dough being fully raised.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view, partly broken away showing one form of the device.

Figure 2 is a perspective view of the sheet of dough used in connection with the device shown in Figure 1.

Figure 3 is a view similar to Figure 1 but showing a slight modification of the first form.

Figure 4 is a plan view of a third and modified form of the invention.

Figure 5 is a side elevation of the form shown in Figure 4.

Figure 6 is a plan view of a fourth form of the invention.

Figure 7 is a view similar to Figure 5 showing the fourth form.

Figure 8 is a plan of a disk used between dough cakes in the form shown in Figures 4 and 5.

In the embodiments of the invention shown in Figures 1, 2 and 3 there is provided a carton having a flat, tray-like body 10 and a folding or hinged cover 11.

In Figure 3 there is also shown a series of crossing and interlocking partitions 12 dividing the body into a series of square compartments. These partitions are of the same height as the body and rest on the bottom thereof so that the top edges of the partitions lie in the same plane as the top edges of the side walls of the body. The square compartments are each intended to receive a substantially square cake 13 of dough and are of such size that the dough cake, when fully raised, will not overfill the compartment.

In the form shown in Figure 1, partitions 14 are provided, which are also crossing and interlocking and the top edges of these partitions are also flush with the plane of the top edges of the side walls of the body 10. The partitions 14 are of less height than the tray, however, so that their bottom edges will lie spaced above the tray bottom when their top edges are in proper position. In this form a dough sheet 15 is placed in the tray before the partitions are inserted and the dough sheet may be somewhat thicker than the distance between the bottom edges of the partitions and the tray bottom so that insertion of the partitions depresses the sheet along rectangular lines and partially divides the dough into biscuits, the batch being held together by the lines of dough beneath said partitions.

It is to be noted that the dough sheet is placed in the container as soon as rolled out and is therefore thin and unraised as shown. This dough sheet will, however, raise after the package is closed. The tops of the partitions being flush with the top edges of the side walls of the container, the cover will, when closed, be engaged by the partitions and will hold the latter down so that the raising of the dough is confined to the compartments formed by the partitions.

In the form shown in Figures 4 and 5, the container has an inner tubular member 16 closed at its lower end. A similar member 17, closed at its upper end fits telescopically over this inner member and forms a top or cover therefor. Around the lower part of the bottom or inner member 16 is secured a band 18 having its upper portion offset outwardly to form a channel for the reception of the edge of the member 17. In this form dough cakes 20 are packed in the bottom member, being separated, one from another, by the interposed circular disks 21. When filled the dough cakes and disks fill most or even all of the space in the lower member and as the dough rises the upper or cover member 17 slides upwardly on the member 16 and thus the necessary space for the risen dough is provided as indicated by dotted lines in Figure 5.

In the form shown in Figures 6 and 7 a square tubular container 22 has a square cap or top 23 provided with a central vent opening 24. In this form the container 22 is partially filled with dough cakes 25 alternated with separating disks 26. In this form the container is filled to such point that the raising of the dough will just fill the container and bring the upper cake into contact with the top to close the vent opening, this opening permitting the air to escape as the dough rises.

In every form the various parts are coated and may be impregnated with a suitable moisture proofing of such nature that the dough will not stick thereto. For instance, a coating of parrafine or edible oil may be used.

It will be noted that the disks 20 and 26 divide their containers, like the partitions 12 and 14, into separate compartments.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A container of the class described having a flat tray like body having upright edges and adapted to contain a sheet of dough, crossing and interlocked partitions removably fitting in said body and of less height than the body and adapted to be inserted in the body with the lower edges of the partitions forced into the dough sheet and the upper edges of the partitions in the plane of the top of the tray sides, and a cover for said container engaging the upper edges of the partitions when closed and holding said partitions against rising under the influence of rising dough in said container.

In testimony whereof I affix my signature.

CHARLES LORBER.